United States Patent

[11] 3,611,155

[72] Inventor Louis F. Mayle
Fort Wayne, Ind.
[21] Appl. No. 801,686
[22] Filed Feb. 24, 1969
[45] Patented Oct. 5, 1971
[73] Assignee The Magnavox Company
Fort Wayne, Ind.

[54] SEARCH-TUNING SYSTEM SENSITIVE TO A DC VOLTAGE CHANGE
7 Claims, 3 Drawing Figs.

[52] U.S. Cl. .......... 325/471, 178/6, 178/DIG. 15, 334/19
[51] Int. Cl. .......... H04b 1/32
[50] Field of Search .......... 178/6, DIG. 15; 325/392, 393, 390, 456, 470, 471, 469; 334/8, 9, 10, 19, 26

[56] References Cited
UNITED STATES PATENTS

| | | | |
|---|---|---|---|
| 2,885,546 | 5/1959 | Taylor et al. | 325/471 |
| 3,374,438 | 3/1968 | Buehler | 325/470 |
| 3,456,197 | 7/1969 | Schulz | 325/470 X |
| 3,467,870 | 9/1969 | Aoyama | 325/470 |

*Primary Examiner*—Robert L. Griffin
*Assistant Examiner*—R. S. Bell
*Attorney*—Richard T. Seeger ABSTRACT: The invention relates to a search-tuning system in which the coils of the relays which control the tuning motors are supplied with electrical energy via a flip-flop circuit. The flip-flop circuit is changed to its other condition to interrupt the supply of energy to the relay coils in response to the rise in DC voltage on the cathode of the FM quadrature demodulator tube in the sound system of the receiver.

The circuit may be combined with an automatic turnoff circuit for turning the set off when there is no 4.5 MHz. sound I-F carrier being produced from the channel to which the turner is tuned.

PATENTED OCT 5 1971

3,611,155

INVENTOR.
BY LOUIS F. MAYLE

JEFFERS & YOUNG
Attorneys

INVENTOR.
LOUIS F. MAYLE
BY
JEFFERS & YOUNG
Attorneys

SEARCH-TUNING SYSTEM SENSITIVE TO A DC VOLTAGE CHANGE

The present invention relates to a search-tuning system for a television receiver and in particular to improvements and refinements therein.

Search tuning for television sets is known, as exemplified in U.S. Pat. No. 3,388,215, but heretofore such systems have required the coincidence of two signals, namely, the intermediate-frequency picture carrier and the horizontal-synchronizing signal to effect stopping the search-tuning motor. Such a system involves the disadvantage that the search-tuning motor, once started, will only stop on a channel which is receiving a picture. On a channel having sound only, which is often the case on a CATV cable, the tuning motor will not stop.

The present invention, in brief, involves the use of a single signal, namely, a direct current voltage developed in the sound 4.5 MHz. quadrature demodulator circuit of the television receiver for stopping the tuning in the proper position.

With the foregoing in mind, a primary objective of the present invention is the provision of a search-tuning system for a television receiver in which the tuning motor is arranged to stop when the 4.5 MHz. intermediate-frequency sound carrier being produced in the receiver is at its maximum amplitude which occurs when the tuner is at its optimum position.

Another object of this invention is the provision of an automatic-search-tuning system for a television receiver which does not require the presence of a synchronizing signal to halt the tuning motor.

Still another object of this invention is the provision of a search-tuning system embodying the advantages referred to above and which is less expensive than previous systems and requires fewer components.

A still further object of this invention is the provision of an automatic-search-tuning system for a television receiver in which no feedback is encountered to video IF and sync leads brought out from the receiver which may produce so called "tweet" in the picture.

It is also an object of this invention to provide a search-tuning system of the nature referred to which requires no adjustment because tuned circuits are eliminated.

It is a still further object to provide a search-tuning system of the nature referred to which can be made insensitive to line voltage variations.

The foregoing objects as well as still other objects and advantages of the present invention will become more apparent upon reference to the accompanying drawings wherein.

BRIEF SUMMARY OF THE INVENTION

The present invention pertains to a search-tuning system for a television receiver in which tuning motor is connected to the television tuner for driving it from channel to channel and is adapted for being energized by a pushbutton on the set, or by a remote operator, and which motor will continue to run after having been energized until the tuner is tuned to a channel which is broadcasting.

According to the present invention a system is provided for deenergizing the motor wherein the system receives a actuating signal from the sound system in the receiver so that a station which only sound, or with both sound and picture, is operable for stopping the tuning motor.

DETAILED DESCRIPTION

Figure 1:
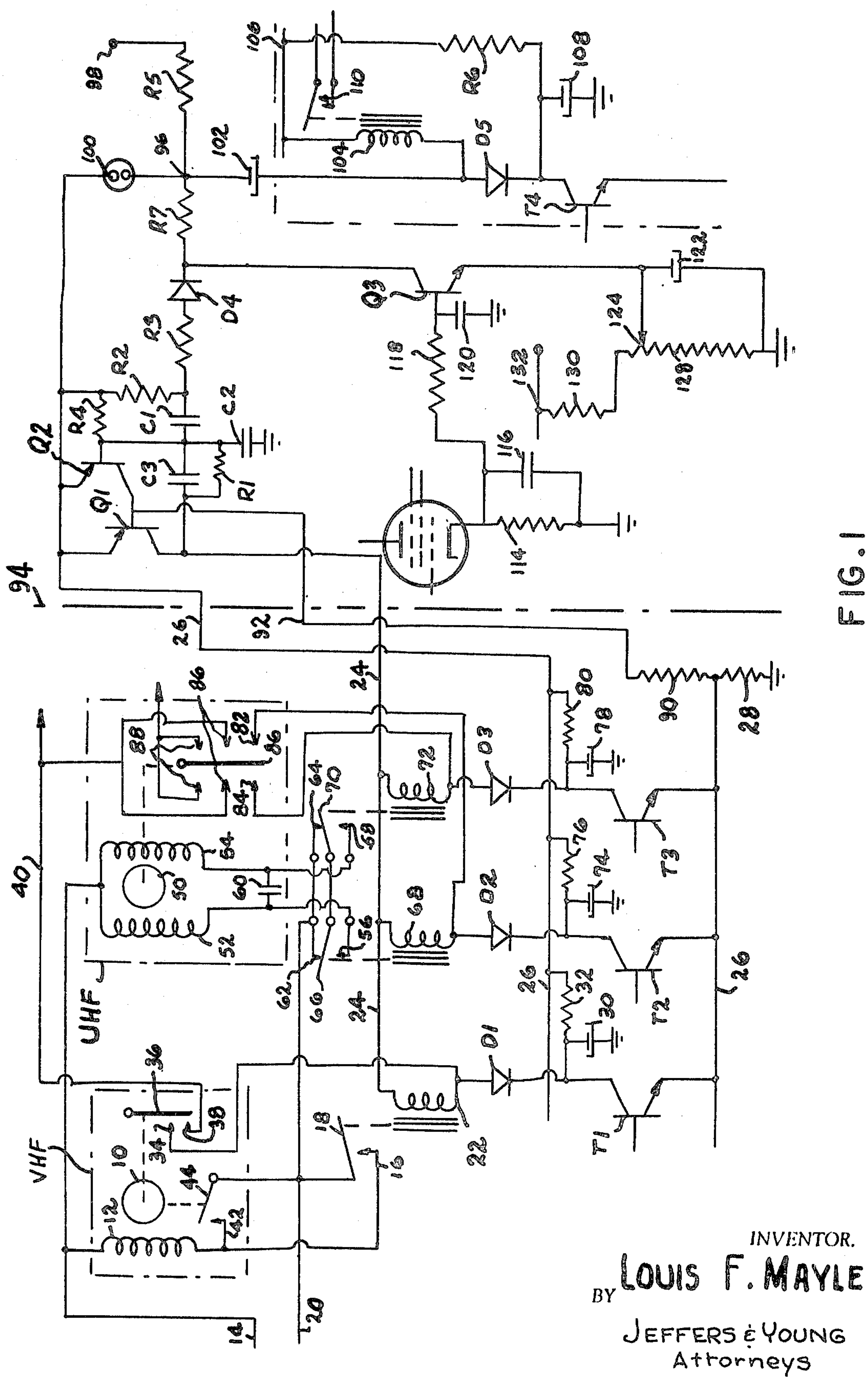
FIG. 1 is a view showing a portion of a television receiver circuit including the automatic-tuning system of the present invention and a portion of the sound demodulator stage of the receiver circuit and a portion of the remote-control system for the set.

Referring to the drawings somewhat more in detail. FIG. 1 shows a VHF-tuning motor having rotor 10 and field coil 12. One end of the field coil is connected to a supply line 14 and the other end thereof is connected to blade 16 of a switch, the second blade 18 of which is connected to the wire 20 forming the other side of the supply line.

Blade 18 is adapted for being closed on blade 16 by energization of a relay coil 22. One end of relay coil 22 is connected to a wire 24 leading to a source of voltage which is controlled in accordance with the present invention as will become more apparent hereinafter. The other end of coil 22 is connected through a diode D1 with the collector of a transistor T1, the emitter of which is connected to a bus line 26 leading through resistor 28 to ground. The collector of the transistor T1 is also connected to the positive side of an electrolytic capacitor 30, the negative side of which is grounded, and through a resistor 32 with a wire 26 which is at substantially constant DC voltage of, say, about 15 volts.

The end of coil 22 connected to diode D1 is also connected to a contact 34 adapted for being engaged by a grounded switch blade 36 when rotor 10 of the VHF-tuning motor is rotating. Switch blade 36 separates from contact 34 as soon as rotor 10 stops rotating. Blade 36 also engages a contact 38 When rotor 10 is turning which is connected by a wire 40 with the audio channel of the receiver so that, whenever rotor 10 is turning, the audio signal is grounded out.

The end coil 12 connected to blade 16 is also connected to a switch blade 42 on which a blade 44 connected to line 20 is adapted to close as rotor 10 turns from one position to the next. Rotor 10 drives a Geneva mechanism, or a similar indexing mechanism, to index the VHF tuner from position to position and blade 44 closes on contact 42 as soon as the tuner commences to rotate and separates from contact 42 only when the tuner has completed an indexing movement.

By means not shown, but well known, a pushbutton on the receiver can be employed for energizing relay coil 22, or transistor T1 can be driven to saturation by a signal supplied to the base thereof by a remote control arrangement.

The receiver also has a UHF-tuning motor comprising a rotor 50 and two coils 52 and 54. The one pair of ends of coils 52 and 54 are connected together and to line 14. Phase shift capacitor 60 connects between the other ends. Direction of rotation is controlled by connecting the line to one side or the other of the phase shift capacitor, as is well known in the art, through contacts 56 and 58.

Pertaining to blades 56 and 58 are the blades 62 and 64 which are connected together and to line 20. Blades 56 and 62 are stationary and moveably located therebetween is a blade 66 normally closed on blade 62 and adapted for being moved into engagement with blade 56 by energization of a relay coil 68.

Electrically connected to blade 66 and disposed between blades 64 and 58 is a further blade 70 normally engaging blade 64 and adapted for being moved into engagement with blade 58 by energization of a relay coil 72.

In the same manner as relay coil 22 is arranged in circuit, coil 68 is in circuit with a diode D2, a transistor T2, and electrolytic capacitor 74 and a resistor 76 connecting the collector of transistor T2 with the bus wire 26. Similarly, coil 72 is in circuit with a diode D3 a transistor T3, an electrolytic capacitor 78 and a resistor 80 connecting the collector of transistor T3 with bus wire 26.

The ends of coils 68 and 72 which are connected to diodes D2 and D3 lead to respective contacts 82 and 84 which are engaged by a grounded blade 86 whenever rotor 50 is rotating in the direction corresponding to the respective coil. When rotor 50 is stationary, blade 86 occupies the position on which it is illustrated in FIG. 1.

When rotor 50 is rotating blade 86 will close on one or the other of contacts 86 which are connected to wire 40 to squelch the sound from the receiver. Still further, whenever rotor 50 is rotating, blade 86 closes on one or the other of contacts 88 which are connected in circuit with the automatic-frequency-control system for the receiver so as to make this system inoperative until the UHF tuner is properly tuned on a channel.

The aforementioned emitter bus wire 26 leads from the end of resistor 28 opposite the ground connection thereof through a resistor 90 to a wire 92. The particular novel portion of the circuit according to the present invention, apart from certain features to be referred to hereinafter, is disposed toward the right of the dot-dash line 94.

To the right of the dot-dash line 94, the line 26, referred to as being at a substantially constant relatively low voltage of, say, 15 volts, is connected to the emitters of PNP transistors Q1 and Q2. Transistors Q1 and Q2 form a flip-flop, or multivibrator, arrangement as will be seen hereinafter. The collector of transistor Q1 is connected to line 24 and the base of transistor Q1 is connected to line 92 and also to the collector of transistor Q2.

The base of transistor Q2 is connected through a resistor R4 with line 26 and through a resistor R1 with line 24 and then through a small capacitor C2 with ground. A capacitor C3 bypasses resistor R1. The base of transistor Q2 is also connected through a capacitor C1 with one end of a resistor R2, the other end of which is connected to line 26 and also with one end of the resistor R3 with the anode of a diode D4 and the cathode of which is connected with one end of resistor R7, the other end of which is connected to a point 96. Point 96 is connected through a resistor R5 with a plus voltage source at 98, of, say, 205 volts. Point 96 is connected through a neon bulb 100 with line 26.

Point 96 is also connected with the positive side of an electrolytic condenser 102, the negative side of which is connected with one end of a relay coil 104, the other end of which is connected with a plus 15-volt line 26. The end of coil 104 opposite line 106 is connected with the positive side or anode of a diode D5 the negative side or cathode of which is connected with the collector of a transistor T4. Line 106 is also connected through a resistor R6 with the collector if transistor T4 and also with the positive side of an electrolytic condenser 108 having its other side grounded.

The circuitry pertaining to coil 104 is similar to that described in connection with coils 22, 68, and 72 and is already known. Coil 104 controls a switch 110 to provide for turning the receiver off in response to a signal from the remote control for the receiver which will drive transistor T4 to conduction or in response to the building up of a predetermined voltage on capacitor 102 which occurs in the absence of a 4.5 MHz. sound IF carrier as will become evident hereinafter.

In the circuit arrangement of FIG. 1 a demodulator tube 112 is employed for sound demodulation and embodies a resistor 114 connected between the cathode of the tube and ground. Resistor 114 is bypassed by a small condenser 116 and the cathode end of resistor 114 is connected through a resistor 118 with the base of a transistor Q3. A condenser 120 is connected between the base of transistor Q3 and ground.

The collector of transistor Q3 is connected to the cathode of diode D4 and the emitter thereof is connected with the positive side of an electrolytic condenser 122 which has its negative side grounded. The emitter of transistor Q3 is also connected to a tap 124 movable along a resistor 126 which at one end is connected through a resistor 128 with ground and at its other end is connected through resistor 130 with a wire 132 which is maintained at a positive potential of, say, 140 volts.

OPERATION OF THE EMBODIMENT OF FIG. 1

Assuming a VHF button on the remote control transmitter to be depressed, the transistor T1 associated with VHF control relay comprising coil 22 saturates and current flow through diode D1 and the collector-emitter path of the transistor so that blade 18 is closed on blade 16 to energize coil 12 and set rotor 10 into motion. As the motor commences to rotate, blade 36 closes on contacts 34 and 38 and blade 44 closes on blade 42. The latter may come about by cam action but movement of blade 36 may be accomplished by drawing the armature of the motor into the motor field from which it is urged by a light spring. After the button on the remote control transmitter is released, transistor T1 becomes nonconductive and diode D1 now ceases to conduct. The hold contact 34, however, maintains relay coil 22 energized so that tuning motor will continue to run. Electrolytic condenser 30 now charges up from wire 26 via resistor 32. A pushbutton on the receiver itself can, of course, be employed for energizing coil 22.

If the tuner comes to a channel on which there is no signal, the tuner motor continues to run and advances the tuner to the next channel. When the tuner reaches a channel which carries a signal, coil 22 of the relay will be deenergized and the tuner motor will be deenergized when the tuner has reached its fully indexed position and blade 44 separates from blade 42 to open the motor-holding circuit. Further, when the motor is deenergized, the spring acting on rotor 10 will move it axially and cause blade 36 to separate from contacts 34 and 38 to open the relay-holding circuit and the squelch circuit for the audio channel.

As to the manner in which coil 22 is deenergized, when the tuner reaches a station carrying a signal, the voltage on resistor 114 will suddenly rise to a value of say, plus 3.5 volts from the no-signal value of, say 2.5 volts. Transistor Q3 will now go to saturation, draining off shut-off condenser 102 and also impressing a negative-going pulse on the base of transistor Q2 through diode D4. Prior to this time, transistor Q1 was at saturation maintaining wire 24 at about 15 volts. When transistor Q2 commences to conduct, the resistor 90 is transferred from the emitter-base path of transistor Q1 to the emitter-collector path of transistor Q2. Transistor Q1 thus goes to nonconduction and the voltage on wire 24 drops and relay 22 is deenergized so that coil 12 will be deenergized and halt the tuner motor as soon as blade 44 leaves contact 42. The inductive kick from coil 22 will produce a negative-going pulse on wire 24 that will be transmitted through capacitor C3 to the base of transistor Q2, holding transistor Q2 at saturation and holding transistor Q1 at cutoff.

This state of transistors Q1 and Q2 is stable and will continue as long as the lower end of coil 22 remains grounded. This condition will thus exist if the pushbutton on the receiver or the pushbutton on the control transmitter pertaining to coil 22 is held down. As soon as the depressed one of these buttons is released current will cease to flow through resistor R1 and also through the emitter-base junction of transistor Q2 and Q2 will become nonconductive and transistor Q1 will again become conductive. The returning of transistors Q1 and Q2 to the last-mentioned state will occur at the time the motor halts if neither of the aforementioned buttons are depressed at the time the motor halts.

If it is the remote control transmitter button which is held depressed after the tuning motor stops, the electrolytic capacitor 30 will remain discharged. When the remote control button is released, transistor T1 becomes nonconductive and the electrolytic capacitor will then 1to charge. This charging current flows through two paths: (1) A greater amount through resistor 32 and, (2) a smaller amount through diode D1, relay coil 22, wire 24, resistor R1 and the emitter-base junction of transistor Q2. The time constant of the charging circuit is such that the current in the second path will keep transistor Q2 saturated for more than a half second. During this period neither tuning motor can be started because transistor Q1 is nonconductive and none of the three relays can be energized. This delay of more than a half second would exist under all other operating conditions without the isolating diode D1 (but with resistor 32). Without both diode D1 and resistor 32, this delay would be 3 to 4 seconds under all other operating conditions. With both diode D1 and resistor 32, this delay is eliminated except when the remote transmitter button is held depressed after the motor has stopped, the delay being more than a half second.

If the remote control transmitter button is released after blade 36 closes on contact 34 and before the motor halts, the diode permits capacitor 30 to charge up before the tuning operation is completed, through resistor 32.

The operation of the UHF-tuning motor is the same as has been described in connection with the VHF motor, except that UHF motor rotor 50 is reversible, depending on which if the coils 52, 54 is directly energized across the AC line by energization of its pertaining relay coil 68, 72. It will will be noted that the energizing current for the energized coil of the UHF motor flows through the blade pertaining to the other coil of the motor so that the UHF motor deenergizes immediately if both of relay coils 68 and 72 are energized, thereby eliminating the possibility of the UHF motor stalling with both of its coils energized.

MODIFICATION OF FIG. 2

Figure 2:
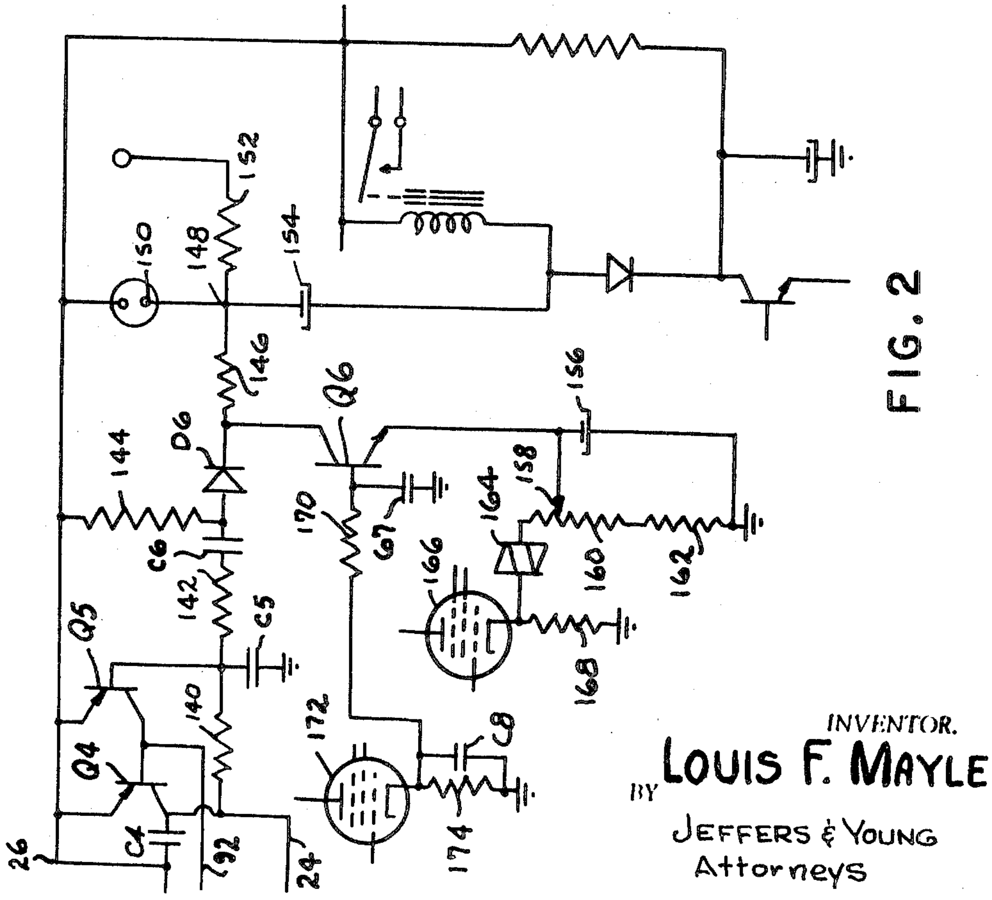
FIG. 2 is a fragmentary view showing a modification of the circuit of FIG. 1.

FIG. 2 shows a modification of that portion of the circuit of FIG. 1 to the right of the dot-dash line 94. This circuit is simplified over the corresponding portion in FIG. 1.

In FIG. 2, wire 26 is connected with the emitter of a PNP transistor Q4, while wire 24 is connected to the collector of the transistor. A capacitor C4 is connected between the emitter and collector of transistor Q4. Wire 92 is connected to the base of transistor Q4 and to the collector of transistor Q5. The emitter of transistor Q5 is connected to wire 26. The base of transistor Q5 is bypassed to ground via a capacitor C5 and is also connected to one end of resistor 140, the other end of which is connected to line 24. The base transistor Q5 is also connected to one end of resistor 142. The other end of resistor 142 is connected to one side of a capacitor C6, the other side of which is connected to the anode of a diode D6 and to one end of the resistor 144 having its other end connected to wire 26.

As in the case of the modification of FIG. 1, the cathode of diode D6 is connected through a resistor 146 with a point 148 which is also connected to one side of a neon bulb 150 having its other side connected to wire 26. Point 148 is connected through a resistor 152 to a plus 205 voltage source and to one side of the automatic shutoff electrolytic capacitor 154. The cathode of diode D6 is connected to the collector of the automatic shutoff transistor Q6, the emitter of which is bypassed through electrolytic capacitor 156 to ground and also to the tap 158, adjustable along a resistor 160, which on one side is connected to ground through a resistor 162 and on the other side is connected through a varistor 164 with the cathode of the audio output tube 166. The cathode of tube 166 is connected to ground through a resistor 168.

The base of transistor Q6 is bypassed to ground through a capacitor 67 and through a resistor 170 to the cathode of demodulator tube 172. The said cathode is connected to ground via a resistor 174 which is bypassed by a capacitor C8.

The circuit of FIG. 2 operates in substantially the same manner as that of FIG. 1.

In the circuit of FIG. 2, normally, when a signal is being received transistor Q6 is at saturation and small signals in the cathode of demodulator tube 172 do not appear in the collector circuit of transistor Q6. When a receiver is manually tuned and the tuner is not quite in the proper position, however, a buzz signal may appear in the collector circuit of transistor Q6 and interfere with the operation of the flip-flop, consisting of transistors Q4 and Q5.

Figure 3:
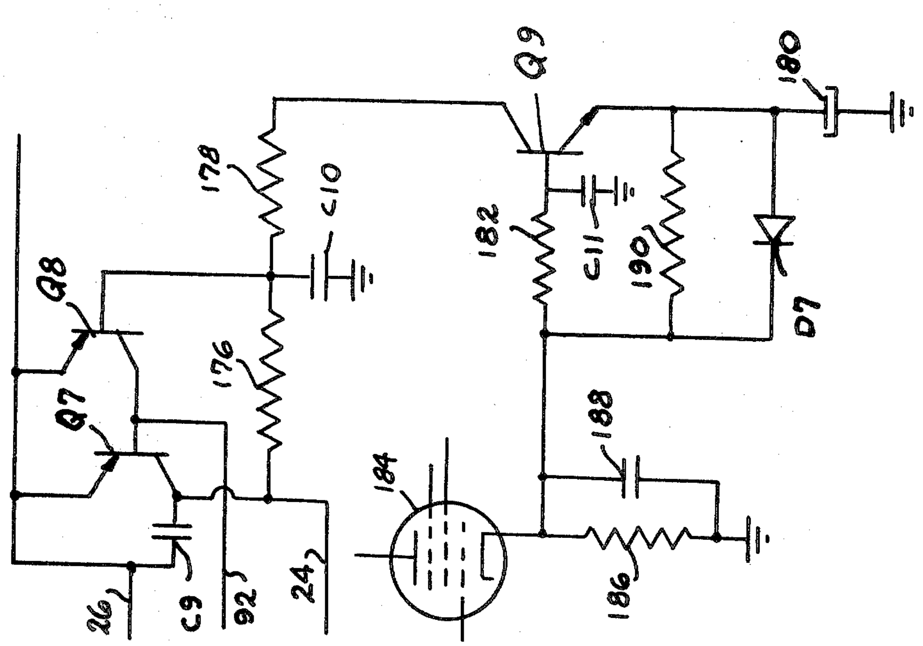
FIG. 3 shows a still further modification of the system.

This problem does not often arise, and is not serious, but it can be taken care of by a circuit of the nature shown in FIG. 3.

MODIFICATION OF FIG. 3

FIG. 3 shows a further modification of that portion of FIG. 1 to the right of dot-dash line 94. The circuit of FIG. 3 is not integrated with the automatic shutoff system, but does not preclude the provision of an automatic shut off system under the control of a DC voltage in the FM demodulator circuit of the set, such as can be derived from the cathode resistor of the demodulator tube.

The circuit of FIG. 3 is extremely simple and involves a minimum number of components.

In FIG. 3, wire 26 is, as before, connected to the emitters of a pair of transistors Q7 and Q8 forming a flip-flop and with wire 26 being maintained at about plus 15 volts. Wire 92 is connected to the base of transistor Q7 and to the collector of transistor Q8.

Wire 24 is connected to the collector of transistor Q7 which is bypassed to wire 26 via a capacitor C9. Wire 24 is also connected to one end of a resistor 176 having its other end connected to the base of transistor Q8 which is bypassed to ground via a capacitor C10 and to one end of a resistor 178, and the other end of which is connected to the collector of transistor Q9.

The emitter of transistor Q9 is connected to the positive side of an electrolytic capacitor 180, the negative side of which is grounded. The base of transistor Q9 is bypassed to ground by a capacitor C11 and is connected to one end of a resistor 182, the other end of which is connected with the cathode of the FM demodulator tube 184.

A resistor 186 connects between ground and said cathode which is bypassed by a capacitor 188. The said cathode is also connected with the positive side of a electrolytic capacitor 180 by a resistor 190 which is shunted by a diode D7 with its anode connecting to capacitor 180.

OPERATION OF MODIFICATION OF FIG. 3

In the operation of the FIG. 3 of FIG. 3, there is a steady-state DC voltage in the cathode of tube 184, (with or without a TV signal), and both the base and the emitter of transistor Q9 will be at the same potential and the transistor will be, therefore, at cutoff. Assuming that no signal is being received and the tuner is driven through a channel having a TV signal, a positive increment of voltage will appear on the cathode of the demodulator tube, and both of capacitors C11 and 180 will commence to charge through their respective resistors 182 and 190. The time constant of resistor 190 and capacitor 180 is about two to three orders of magnitude larger than the time constant of resistor 182 and its capacitor C11 so that capacitor 180 will commence to charge through resistor 182 and the base-emitter junction of transistor Q9 whenever the voltage across said junction exceeds the threshold value.

When base current flows in transistor Q9 in the aforementioned manner, the transistor will conduct and electrolytic capacitor 180 will also charge through resistor 178, as well as through resistors 182 and 190. The current through resistor 178 is supplied through the emitter-base junction of transistor Q8 causing this transistor to conduct, thus cutting off transistor Q7. When transistor Q7 is cut off, wire 24 goes to near ground potential and which ever tuning motor relay is then energized will become deenergized causing the then-energized tuning motor to become deenergized and halt.

As electrolytic capacitor 180 continues to charge, it will reach the point that the voltage between the base and emitter of transistor Q9 will be less than the threshold voltage and transistor Q9 will then go to cutoff and capacitor 180 will thereafter finish charging up through its own resistor 190.

Diode D7 is provided to permit rapid discharging of capacitor 180 to the no-signal voltage level of the cathode of tube 184 when the latter is without a signal. This is necessary because if the tuner is setting on a channel having a signal and there is a signal on the next adjacent channel, when the tuner is actuated capacitor 180 may not have time to discharge so that when the tuner reaches the said next channel, transistor Q9 will not become conductive because its emitter voltage has not dropped far enough to permit the emitter-base threshold voltage to be exceeded when the cathode voltage of tube 184 rises. In this case, transistor Q8 would not become conductive and transistor Q7 would not become nonconductive and the tuning motor would not stop and a channel having a signal would, therefore, be bypassed.

An advantage of the circuit of FIG. 3 is that it is insensitive to line voltage variations, thus eliminating the necessity of using varistors or any other components to compensate for variations in line voltage.

Each modification shown embodies a flip-flop to interrupt the supply of energy to the relay coils when the voltage rises on the cathode of the FM demodulator tube in the sound demodulator circuit of the receiver, thus making the systems operable on sound-only channels as well as on channels having both sound and picture.

The systems of the present invention are inexpensive and involve only a few single components and can be made substantially insensitive to line voltage It will be understood that it is intended to include modifications and adaptations of the invention falling within the scope of the appended claims:

What is claimed is:

1. In a search tuning system for a television receiver having tuner means operated by tuning motors means and an audio system including sound demodulator means having a DC voltage which changes when a sound carrier is encountered; energizing circuit means for said motor means, relay means actuatable for completing said energizing circuit means and comprising coil means energizable for actuating said relay means, a source of voltage, a control circuit connecting one end of said coil means to said source of voltage, means for connecting the other end of said coil means to a point lower in potential than said source to energize said coil means, and control means including said control circuit operable in response to a change in said DC voltage present in said demodulator means for interrupting the supply of voltage from said source to said one end of said coil means to deenergize said coil means.

2. A search-tuning system according to claim 1 in which said control circuit comprises a first and normally conductive transistor having its collector-emitter path interposed between said source and said one end of said coil means, a second and normally nonconductive transistor connected to the base of said first transistor and operable when made conductive to bias said first transistor to cutoff, and said control means being connected to the base of said second transistor and biasing said second transistor to conduction in response to a rise in voltage in said demodulator means.

3. A search-tuning system according to claim 2 in which said control means comprises a third transistor having its collector-emitter path connected between a second source of voltage and ground and having its base connected to the DC voltage point in said demodulator means, a rise in voltage point of said demodulation means biasing said third transistor to conduction, and a connection from the collector-emitter path of said third transistor on the side nearest said second source to the base of said second transistor to bias said second transistor to conduction when said third transistor goes to conduction.

4. A search-tuning system according to claim 3 in which said receiver comprises an automatic shutoff system which includes an electrolytic capacitor connected to a third source so as to be charged thereby in the absence of a signal on a channel to which the receiver is tuned, said third transistor discharging said capacitor when said third transistor becomes conductive.

5. A search-tuning system according to claim 3, which includes components connecting both of the base and emitter of said third transistor to said DC voltage point of said demodulator means and holding said base and said emitter at the same potential under steady state voltage conditions of said DC voltage point whereby said third transistor is nonconductive under said steady-state condition, said components providing for a differential between the times the base and emitter of said third transistor reach the potential of said DC voltage point upon a rise in said voltage whereby said third transistor becomes conductive for a predetermined time only upon a rise in said voltage.

6. A search-tuning system according to claim 5 in which said components include resistance-capacitance combinations between said DC voltage point of said demodulator means and each of said base and emitter with the latter having the greatest time constant.

7. A search-tuning system according to claim 6, which includes a diode in parallel with the resistor of the network pertaining to the emitter of said third transistor to permit rapid discharging of the respective capacitance upon a drop in the voltage at said DC voltage point.